United States Patent [19]

Shah et al.

[11] Patent Number: 4,476,683

[45] Date of Patent: Oct. 16, 1984

[54] ENERGY EFFICIENT MULTI-STAGE WATER GAS SHIFT REACTION

[75] Inventors: Rasiklal P. Shah, Latham; Cynthia L. Gleason, Schenectady, both of N.Y.

[73] Assignee: General Electric Company, Schenectady, N.Y.

[21] Appl. No.: 451,363

[22] Filed: Dec. 20, 1982

[51] Int. Cl.$^3$ ............................................. F01K 17/00
[52] U.S. Cl. ...................................... 60/648; 60/653; 60/689; 48/197 R; 423/655
[58] Field of Search ................. 60/648, 653, 670, 689; 48/197 R; 252/313; 423/655, 656

[56] References Cited

U.S. PATENT DOCUMENTS

| | | | |
|---|---|---|---|
| 3,720,625 | 3/1973 | Kapp et al. | 423/656 X |
| 3,787,192 | 1/1974 | Ban | 48/202 |
| 3,850,841 | 11/1974 | Aldridge et al. | 423/655 X |
| 4,017,271 | 4/1977 | Barclay et al. | 48/197 R |
| 4,099,383 | 7/1978 | Paull et al. | 60/648 |

OTHER PUBLICATIONS

Cox, et al., "Hydrogen: Its Technology and Implications", vol. 1, pp. 68–75 and 113–115, CRC Press, Inc. 1977.
Buckingham et al., "Engineering Evaluation of Conceptual Coal Conversion Plant Using the H–Coal Liquefaction Process", Electric Power Research Institute Final Report AF–1297, Project 411–4, Dec. 1979, pp. 4-10-0-4-417.

Primary Examiner—Stephen F. Husar
Attorney, Agent, or Firm—Bernard J. Lacomis; James C. Davis, Jr.

[57] ABSTRACT

A process for the energy efficient conduct of a multi-stage water gas shift reaction includes furnishing a carbon monoxide-containing feed gas stream at an inlet temperature of at least 600° F. and water to a high-temperature shift reactor stage to produce a carbon dioxide and hydrogen enriched exhaust gas stream and introducing the exhaust gas stream to a low-temperature shift reactor stage at an inlet temperature of about 300°–500° F. to produce a product gas stream further enriched in carbon dioxide and hydrogen. A heat exchange fluid is passed in heat exchange relationship with at least the feed and exhaust gas streams to recover thermal energy therefrom by concurrently cooling the gas streams and heating the heat exchange fluid. Desirably, a water heat exchange fluid is heated by the gas streams to superheated steam which is expanded through a steam turbine coupled to a generator to produce electrical energy and the steam turbine exhaust steam is directed to the high temperature shift reactor to provide the water feed thereto.

17 Claims, 2 Drawing Figures

ENERGY EFFICIENT MULTI-STAGE WATER GAS SHIFT REACTION

BACKGROUND OF THE INVENTION

The present invention relates to exothermic processes such as the water gas shift reaction and, more particularly, to an energy efficient method for conducting a multi-stage water gas shift reaction which includes simultaneous generation of process steam and electrical power.

Various type industrial process plants, e.g., petrochemical plants, refineries, and the like, utilize process steam and electrical power for plant operation and generate substantial quantities of process heat. Traditionally, the process heat sources are employed to produce saturated steam at pressure levels suitable for process use and any surplus steam is expanded through low-pressure steam turbines to generate a portion of the plant electrical demand. Although such a method of integrating the plant utility functions surely improves, to a point, the overall energy utilization of the plant, in this age of very expensive and ever-increasing energy costs, the traditional approach to utilities integration as a means of energy economy has been found seriously wanting. Indeed, no longer can energy economy be viewed simply as a matter of most efficiently utilizing whatever energy a process plant may produce. Rather, process parameters must be re-examined and processes reconfigured with an eye toward developing new methods for operating the processes in order to increase the effectiveness of process energy utilization above what was perhaps heretofore thought possible. In this way, by integrating process parameter selection with process energy utilization efficiency, the overall efficiency of industrial processes can be significantly improved.

A fundamental step in improving the overall energy efficiency of industrial processes, for example direct coal liquefaction, coal gasification, ammonia synthesis, methanation, catalytic oxidation such as $SO_2 + \frac{1}{2}O_2 \rightarrow SO_3$, and the like, is to focus on improving the overall energy efficiency of exothermic sub-processes or unit process thereof which have wide applicability to many industrial processes. One example of such a unit process, which traditionally has been operated in an energy inefficient fashion, is the well-known water-gas shift reaction process:

$$CO + H_2O \rightarrow CO_2 + H_2$$

This process reacts carbon monoxide gas (CO) with steam to produce a mixture of hydrogen and carbon dioxide gases. The reaction is exothermic and typically employs a catalyst, such as iron, iron compounds (e.g., oxides), chromium, chromium compounds (e.g., oxides), mixtures thereof, and other catalyst materials well known to the art. The rate of conversion of the reaction is accelerated at higher temperatures while the extent of conversion is enhanced by lower reaction temperatures. When the carbon dioxide is separated from the product gas mixture, such as by use of carbonate-forming systems, ethanolamine absorbents, or other known means for removing carbon dioxide, a gas stream having a higher concentration of hydrogen is obtained.

The water gas shift reaction is typically carried out using either a single stage shift reactor or a multi-stage, generally two stage, shift reactor to attain the desired degree and rate of conversion of carbon monoxide and steam to hydrogen. In carrying out the water gas shift reaction in a single stage, steam is introduced into the shift reactor together with the carbon monoxide-containing gaseous stream, which typically also includes hydrogen and carbon dioxide, in the presence of an appropriately selected catalyst. The single stage water gas shift reaction is exothermic and favored by inlet temperatures generally in the range 450° to 900° F. The gaseous effluent leaving the shift reactor, consisting essentially of carbon dioxide and hydrogen gas, is typically subjected to a carbon dioxide removal process to increase the hydrogen concentration in the product stream. In a conventional two-stage water gas shift conversion process, two catalytic shift reactors, operating at high and low temperatures respectively, are used to attain the desired degree of conversion to hydrogen. A carbon monoxide-containing feed stream, typically including hydrogen and carbon dioxide, is first fed to the high-temperature shift reactor. The water vapor concentration required for the shift reaction is frequently added to the feed gas stream upstream of the high-temperature shift reactor by quenching the feed gas with water to cool the normally very hot feed gas stream to a lower temperature. In some instances water in the form of steam may be added directly to the shift reactor. The partially shifted gas stream exiting the high-temperature shift reactor, at a temperature higher than that of the entering feed gas stream as a result of the exothermic nature of the shift reaction, is cooled to a temperature level appropriate for the low-temperature shift reaction stage and introduced into the low temperature shift reactor. The fully shifted product gas stream exiting the low-temperature shift reactor is cooled to a temperature appropriate for the separation and removal of carbon dioxide and carbon dioxide is removed therefrom to produce a hydrogen-rich product gas stream.

Whether the water gas shift reaction is carried out in one or multiple stages of shift reaction, the conventional approach is to select process parameters and configurations which optimize yield which at the same time utilizing whatever process steam and/or process energy may become available as a result of operating at the selected process parameters and supplementing the available process steam and/or energy with on-site produced steam and electrical generation, for example by combustion of fuel. It has now been found, as illustrated by the invention described and claimed in the present application, that selecting processes parameters and configurations to optimize process yield does not always optimize overall process economics. Indeed, the very high cost of energy frequently dictates the selection of process parameters and configurations which maximize and/or optimize process energy production, recovery and economic utilization to achieve a significant improvement in overall process economics. This is particularly so in connection with the conduct of the water gas shift reaction process.

It is therefore an object of the present invention to provide a process for the conduct of a multi-stage water gas shift reaction which maximizes and/or optimizes process energy production, recovery and utilization efficiency to achieve significantly improved overall process economics as compared with heretofore conventional water gas shift reaction processes.

SUMMARY OF THE INVENTION

In one aspect of the present invention this object is accomplished by providing a process for the energy efficient conduct of a multi-stage water gas shift reaction which comprises the steps of furnishing a carbon monoxide-containing feed gas stream and water to a high-temperature shift reactor stage at an inlet temperature to the reactor of at least about 600° F. for exothermically and catalytically reacting a portion of the carbon monoxide and water to produce a carbon dioxide and hydrogen enriched exhaust gas stream, cooling the product gas stream and passing a heat exchange fluid in heat transfer relationship with at least the feed stream and the exhaust gas stream to recover thermal energy therefrom by concurrently cooling the feed and exhaust gas streams and heating the heat exchange fluid. At least a portion of the recovered thermal energy is usefully converted to mechanical and/or electrical energy.

In another aspect of the invention the heat exchange fluid is water, at least a portion of the water is heated to superheated steam, the superheated steam drives an expansion engine to produce mechanical energy convertible to electrical energy in a generator, and the expansion engine exhaust stream is employed as the water feed to the high-temperature shift reactor stage.

In a particularly preferred aspect of the invention as applied to an entrained flow-type gasification process as a source of feed gas, the temperature of the feed gas stream upstream of the high-temperature shift reactor stage is substantially above the shift reactor inlet temperature, the heat exchange fluid is water, the water is heated in heat exchange relationship with the exhaust gas stream from the low-temperature shift reactor, and the heated water is vaporized in heat exchange relationship with the exhaust gas stream from the high-temperature shift reactor. The resulting superheated steam is used to drive an expansion engine-electrical generator to produce electrical energy and the steam exhausting the expansion engine is used as the water feed to the high-temperature shift reactor stage.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the detailed description taken in connection with the accompanying drawings in which:

BEST MODE FOR CARRYING OUT THE INVENTION

Figure 1:
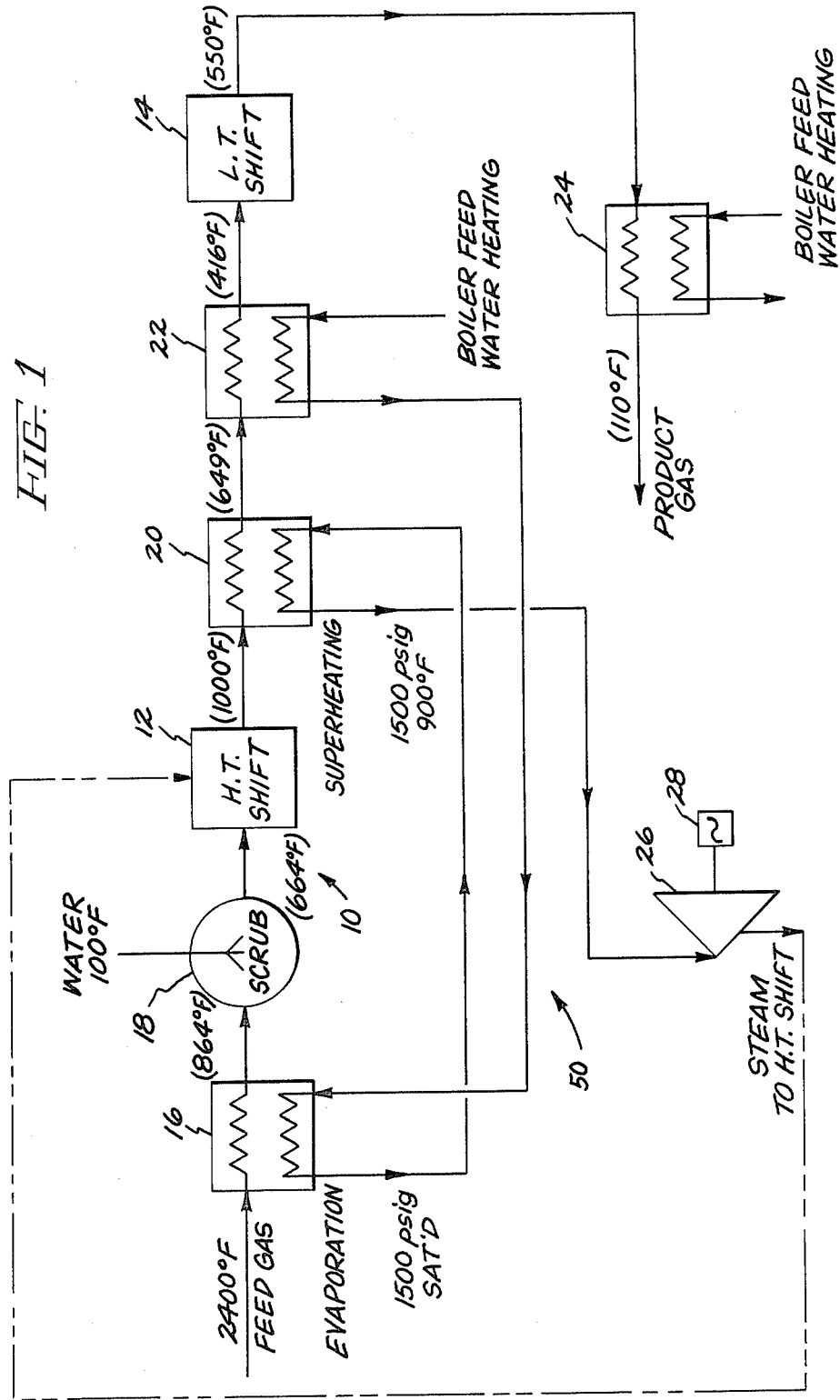
FIG. 1 is a schematic flow diagram illustrating one embodiment of the improved process of the present invention.

Maximization and/or optimization of process energy production, recovery and utilization efficiency is achieved in the water gas shift reaction process, as well as other industrial processes, in accordance with the present invention, by (1) carefully matching energy availability with energy utilization to assure, for example, that all "high-grade" thermal energy sources (with temperature levels above the pinch point of the steam generation cycle) are most efficiently employed to service the high temperature process requirements (e.g., superheating of steam), and (2) judicious selection of process parameters to transform heretofore relatively low-grade thermal energy sources into higher-grade sources. The manner in which this is achieved will become more apparent from a consideration of a specific embodiment of the present invention, shown in FIG. 1, wherein a system 10 for the energy efficient conduct of a multi-stage water gas shift reaction is illustrated. The system utilizes two catalytic shift reactors, a high-temperature reactor 12 and a low-temperature reactor 14. Inasmuch as the water gas shift reaction is known to be exothermic it provides an ideal mechanism for readily upgrading the thermal energy content and temperature of the gas stream fed to the reactors and for transforming low-grade thermal energy sources into higher-grade sources. Thus, the thermal energy content of the gaseous effluent from a shift reactor can be tailored by selecting the reactor feed stream inlet temperature. The water gas shift reaction is known to be temperature sensitive in that higher reaction temperatures tend to accelerate the rate of conversion while retarding the extent of conversion. By contrast, lower reaction temperatures tend to increase the extent of conversion, albeit at the expense of reaction rate. Thus, in order to obtain high temperature, high thermal energy content effluent streams from a shift reactor it is necessary to operate the reactor at higher inlet temperatures although this results in somewhat reduced conversion of carbon monoxide and attendant reduced production of hydrogen gas. It has been determined, in accordance with the present invention, that competing considerations can be reconciled and energy economy realized while superior carbon monoxide conversion and hydrogen production are achieved, in a process which maximizes overall energy efficiency, by operating high temperature shift reactor 12 at a feed gas stream temperature of at least 600° F. Although from an energy standpoint alone it is desirable to operate the reactor at as high a temperature as possible above 600° F., practical considerations, such as prolonging catalyst life and preserving catalyst structural strength, suggest that the feed gas stream temperature should be limited such that the exothermic reactions of the high-temperature shift reactor produce an exit gas temperature therefrom at the maximum limit for maintaining catalyst integrity, which exit temperature is about 1000° F. for current state of the art catalysts. Typically this would require a feed gas temperature of about 800° F. to about 900° F. With the high-temperature shift reactor 12 operating at these high temperatures, low-temperature shift reactor 14 must be operated within a temperature range which assures adequate overall carbon monoxide conversion and hydrogen production in commercially reasonable time periods using commercially feasible and affordable reactors. Thus, in accordance with the present invention, the feed gas stream to the low-temperature shift reactor 14 should have a temperature in the range 300° to 500° F. and, preferably, 400°–500° F.

With the high-and low-temperature shift reactors 12 and 14, respectively, operating within the respective feed gas stream temperature ranges specified, the respective shift reactor exhaust gas streams will have a predetermined thermal energy content which can be efficiently recovered and utilized to provide the process steam and electrical energy requirements of the water gas shift reaction process as well as to provide steam and electrical power to support the gasification, liquefaction or other industrial process of which the shift reaction process is a part. Typically, the feed gas stream is a very high temperature carbon monoxide and hydrogen-containing gas mixture produced elsewhere in the industrial process, for example by a vacuum bottom-gasification process associated with a direct coal liquefaction plant, which must be substantially cooled before its temperature is sufficiently low for it to be introduced into the high-temperature shift reactor 12 in accordance with the present invention. The recovery and efficient utilization of the thermal energy of the feed stream enhances the overall energy efficiency of the process and provides an important thermal energy source.

In the embodiment shown in FIG. 1, the feed gas stream to the high-temperature shift reactor 12, consisting essentially of carbon monoxide, hydrogen and carbon dioxide, exits the gasifier of a vacuum bottom-gasification process at about 2400° F., is initially cooled in a heat exchanger 16 and is then subjected to a water scrub in a scrubber 18 to remove solid impurities in the feed stream and to further reduce the stream temperature to a range suitable for introduction into high-temperature shift reactor 12. Although the amount of cooling in heat exchanger 16 and the extent of scrubbing and cooling in scrubber 18 will vary from stream to stream, it is desirable to maximize the recoverable thermal energy in heat exchanger 16 while minimizing the thermal energy lost in scrubber 18. Exemplary temperatures for the feed gas streams exiting heat exchanger 16 and scrubber 18, in the embodiment shown in FIG. 1, are 864° F. and 664° F., respectively. The water vapor concentration desired for the water gas shift reaction is maintained by injecting process steam into reactor 12. Due to the exothermic nature of the shift reaction occurring in reactor 12, the exhaust gas stream exiting reactor 12 has a higher thermal content and temperature, for example about 1000° F. in the embodiment shown, than the feed gas stream. The exhaust gas stream is cooled in heat exchangers 20 and 22 prior to introduction into low-temperature shift reactor 14. The extent of cooling in each of heat exchangers 20 and 22 is largely a matter of choice dependent upon the configuration of the cooling system employed. However, exemplary temperatures for the exhaust gas stream and cooling system configuration shown are 649° F. exiting heat exchanger 20 and 416° F. exiting heat exchanger 22 and entering low-temperature shift reactor 14. Due to the exothermic nature of the shift reaction occurring in reactor 14, the product gas stream exiting reactor 14 has a greater thermal content and temperature than the cooled exhaust gas stream entering reactor 14. The relatively hot product gas stream, at about 550° F. in the embodiment of FIG. 1, is cooled in heat exchanger 24 to a temperature of about 110° F. at which carbon dioxide removal and/or other gas clean-up can conveniently be accomplished.

The cooling system 50 circulates a heat exchange fluid, such as water, into heat transfer relationship with the feed gas stream, exhaust gas stream and product gas stream to cool these various streams, as required by the shift reaction process, and to recover the thermal energy given up by each. Thus, in one cooling circuit boiler feed water is initially supplied to heat exchanger 22 to cool the exhaust gas stream and concurrently to heat exchanger 16 wherein it is vaporized to saturated steam by heat transfer relationship with the feed gas stream while the feed gas stream is cooled. Also, while the stream energy in heat exchanger 16 can be used for superheating duty for maximum thermodynamic advantage, other process considerations such as erosion in heat exchanger 16 due to contaminants such as ash in the feed gas stream may indicate an economic preference for evaporation duty in heat exchanger 16. The saturated steam from heat exchanger 16 is next passed through heat exchanger 20 in heat transfer relationship with the very hot exhaust gas exiting shift reactor 12 to superheat the steam while cooling the exhaust gas. The superheated steam is most efficiently utilized by expanding it in a high pressure/high temperature steam turbine 26 wherein it produces shaft mechanical work convertible to electrical power in coupled electrical generator 28. The relatively low pressure steam exhausting turbine 26 is advantageously directed to high-temperature shift reactor 12 to provide the water vapor concentration necessary for the shift reactors. In another cooling circuit, boiler feed water is supplied to heat exchanger 24 to cool the product gas stream and concurrently to heat the feed water which may be used for various utility purposes.

Figure 2:
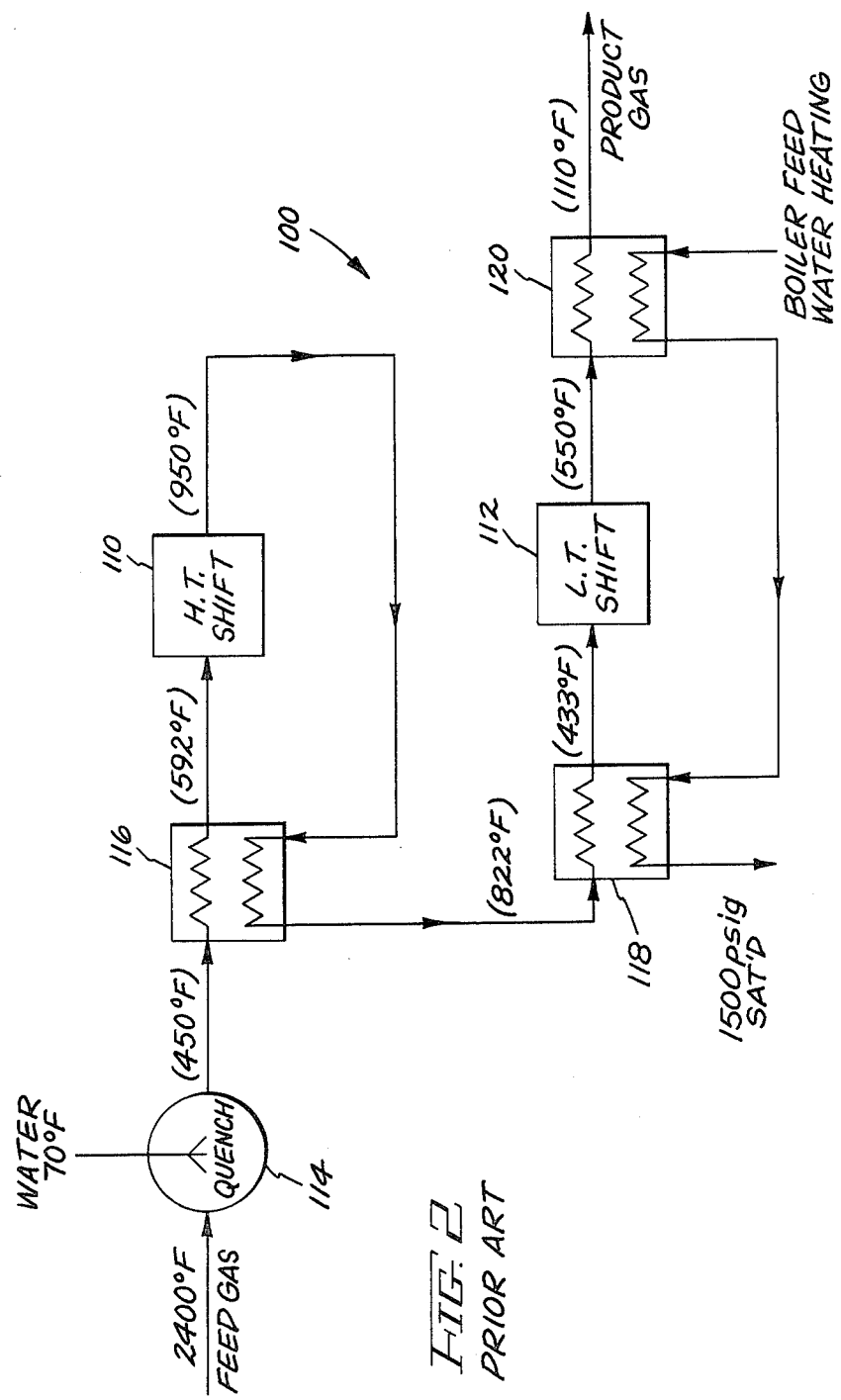
FIG. 2 is a schematic flow diagram illustrating a prior art conventional two-stage shift reactor system.

The economics of the water gas shift reaction system configured as shown in FIG. 1 and employing the system parameters described are particularly favorable. Indeed, such a system not only generates all the process steam and power it uses but it produces a substantial excess of energy in the form of heated water and significant electrical power. By contrast, a conventional multi-stage water gas shift reaction system 100, such as is illustrated in FIG. 2, with the same feed gas stream not only utilizes very large quantities of water but produces only a small amount of saturated steam and no electrical power. System 100 includes two catalytic shift reactors 110 and 112, operating at relatively high and low temperature levels, respectively, for attaining the desired degree of conversion of carbon monoxide and water to carbon dioxide and hydrogen. The water vapor concentration required for the shift reactions is added to the high temperature feed gas stream by quenching the feed gas with water in quench unit 114. The temperature of the quenched gas exiting unit 114 is determined by the amount of water addition required by the shift reactions. In a typical water gas shift reaction process, very large quantities of water are needed for the reaction and the quenched feed gas generally emerges from unit 114 at a temperature below that desired for a conventional high temperature shift reaction. The quenched feed gas may be efficiently heated in heat exchanger 116, upstream of shift reactor 110, by passing the feed gas in heat transfer relationship with the higher temperature and thermal content of the exhaust gas stream from the high-temperature shift reactor. The partially cooled exhaust gas stream exiting heat exchanger 116 is further cooled to a temperature suitable for introduction into a conventional low-temperature shift reactor in heat exchanger 118. Following the exothermic shift reaction in reactor 112 the increased thermal content and temperature product gas stream exiting reactor 112 is cooled in heat exchanger 120 to a temperature, about 110° F., at which carbon dioxide removal and/or other gas clean-up can conveniently be accomplished.

Table I contrasts the improved energy efficient performance of the water gas shift reaction system of FIG. 1 with the performance attainable using a conventional water gas shift reaction system, as shown in FIG. 2. The temperatures appearing in parentheses in FIGS. 1 and 2 are typical of the system temperature distribution for the input quantities shown in Table I when shift reactor operating temperatures are selected as indicated. It will, of course, be appreciated that the temperature distribution for each system will vary with the quantities, compositions and temperatures of the input streams and the operating temperatures of the shift reactors.

TABLE 1

|  | FIG. 1 | FIG. 2 |
|---|---|---|
| Input | | |
| Feed Gas (lbs/hr) | 823,475 | 823,475 |
| Quench Water (lbs/hr) | 61,444 | 586,000 |
| Process Steam (lbs/hr) | 530,169* | 0 |
| Output | | |
| Hydrogen (lbs/hr) | 63,055 | 62,922 |
| Gross Steam Gen. (lbs/hr) | | |
| 1500 psig sat'd | 0 | 222,655 |
| 1500 psig superhtd | 876,533* | 0 |
| Net Electrical Gen, MWe | 57* | 0 |
| Hydrogen Concentration (mole %) | | |
| Inlet to HT Shift | 17.4** | 17.4 |
| Exit from HT Shift | 35.7 | 36.5 |
| Inlet to LT Shift | 35.7 | 36.5 |
| Exit from LT Shift | 41.9 | 42.0 |

*876,533 lbs/hr of high pressure superheated steam is expanded through a steam turbine and coupled electrical generator to produce 57 MW of electrical energy and 530,169 lb/hr of process steam at 660 psig (extracted from steam turbine).
**as a fraction of combined input of feed gas and process stream.

It is noteworthy from Table I that the systems of FIGS. 1 and 2 utilize the very same feed gas and produce substantially the same yield of hydrogen in the product gas. It is also noteworthy that the conventional multi-stage water gas shift reaction process of FIG. 2 uses very substantial quantities of quench water to produce, from an energy standpoint, only a small quantity of saturated steam. By contrast, the process of the present invention utilizes relatively little quench water yet manages to produce 57 MW of electrical energy in addition to generating its own process steam requirements. The improved energy efficiency and resulting process economics of the FIG. 1 system are, therefore readily apparent. In large part this result is attributable to the careful selection of shift reactor operating temperatures to achieve a better balance between high-level (above pinch point) and low-level (below pinch point) thermal energy sources for a more effective energy utilization.

Industrial Applicability

The energy efficient process of the present invention is broadly applicable to industrial processes, such as direct coal liquefaction, coal gasification, ammonia synthesis, methanation, catalytic oxidation such as $SO_2 + \frac{1}{2}O_2 \rightarrow SO_3$ and the like, which utilize exothermic processes such as the water gas shift reaction as a subprocess or unit process thereof. Typically, the feed gas stream for the shift reaction process is a very high temperature carbon monoxide and hydrogen containing gas mixture produced elsewhere in another subprocess of the industrial process. By carefully cooling this feed gas stream in heat transfer relationship with a water coolant to utilize the thermal energy from the feed gas to vaporize the water to steam and then utilizing the resulting steam as a heat transfer fluid to cool the high temperature exhaust gas stream from the high-temperature shift reactor in order to cool the exhaust stream in preparation for low temperature shift conversion while superheating the steam, maximum utilization is made of the thermal energy of the feed gas and the thermal energy generated in the shift reactor while the conversion of carbon dioxide to hydrogen is as efficiently accomplished as in any heretofore known multi-stage shift reaction process. In addition, when it is appreciated the superheated steam produced in the present invention, besides furnishing the process steam needs of the shift reaction processes, is capable of generating 57 MW of electrical energy by expansion through an apparatus, the overall process efficiency achieved by the present invention is apparent.

Thus a process for the conduct of a multi-stage water gas shift reaction which maximizes and/or optimizes process energy production, recovery and utilization efficiency to achieve significantly improved overall process economies as compared with heretofore conventional water gas shift reaction processes has been described and illustrated.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method of increasing efficiency of energy utilization comprising:
   (a) furnishing reactants to a catalytic reactor such that an exothermic reaction thereof forms a product gas stream;
   (b) passing a heat exchange fluid in heat transfer relationship with said reactants and successively passing said heat exchange fluid in heat transfer relationship with at least said product gas stream to recover thermal energy therefrom by concurrently cooling the product gas stream and heating the heat exchange fluid; and
   (c) converting at least a portion of the recovered thermal energy to mechanical energy,
   wherein the temperature of the product gas stream is above the pinch point of the heat exchange fluid and the exothermic reaction is chosen from the group consisting of methanation, ammonia synthesis and catalytic oxidation.

2. The method of claim 1 wherein said catalytic oxidation proceeds according to the equation $SO_2 + \frac{1}{2}O_2 \rightarrow SO_3$.

3. In a process for the energy efficient content of a multi-stage water gas shift reaction including the steps of furnishing a carbon monoxide-containing feed gas stream and water to a high-temperature shift reactor stage for exothermically and catalytically reacting a portion of the carbon monoxide and water to produce a carbon dioxide and hydrogen enriched exhaust gas stream and introducing said exhaust gas stream into a low-temperature shift reactor stage for exothermically and catalytically reacting said exhaust gas stream to produce a product gas stream further enriched in carbon dioxide and hydrogen and cooling said product gas stream, the improvement comprising:
   furnishing said feed gas stream to said high temperature shift reactor stage at an inlet temperature such that the temperature of the exhaust gas stream is at the maximum temperature at which the integrity of the catalyst is maintained;
   passing a heat exchange fluid in heat transfer relationship with said feed gas stream and successively passing said heat exchange fluid in heat transfer relationship with at least said exhaust gas stream to recover thermal energy therefrom by concurrently cooling said feed and exhaust gas streams and heating said heat exchange fluid; and converting at least a portion of said recovered thermal energy to mechanical energy.

4. A process as claimed in claim 3, wherein said feed gas stream is furnished to said high temperature shift reactor stage at a temperature of at least 600° F.

5. A process as claimed in claim 3, wherein said feed gas stream is furnished to said high temperature shift reactor stage at a temperature in the range of about 800° F. to about 900° F.

6. A process as claimed in claim 3, wherein said exhaust gas stream is introduced into said low temperature shift reactor at a temperature in the range of about 300° F. to about 500° F.

7. A process as claimed in claim 3, wherein said portion of recovered thermal energy is converted to mechanical energy in an expansion engine.

8. A process as claimed in claim 3, including the further step of converting said mechanical energy to electrical energy.

9. A process as claimed in claim 3, wherein said heat exchange fluid comprises water.

10. A process as claimed in claim 9, wherein at least a portion of said water is heated to superheated steam.

11. A process as claimed in claim 10, wherein said step of converting thermal energy to mechanical energy comprises expanding said superheated steam in an expansion engine and exhausting steam therefrom.

12. A process as claimed in claim 11, wherein said exhaust steam is directed to said high-temperature shift reactor as the water feed thereto.

13. A process as claimed in claim 1, wherein said feed gas is furnished to said high temperature shift reactor such that the temperature of the exhaust gas stream is above the pinch point of the heat exchange fluid.

14. In a process for the energy efficient conduct of a multi-stage water gas shift reaction including the steps of furnishing a carbon monoxide-containing feed gas stream and water to a high-temperature shift reactor stage for exothermically and catalytically reacting a portion of the carbon monoxide and water to produce a carbon dioxide and hydrogen enriched exhaust gas stream and introducing said exhaust gas stream into a low-temperature shift reactor stage for exothermically and catalytically reacting said exhaust gas stream to produce a product gas stream further enriched in carbon dioxide and hydrogen and cooling said product gas stream, the improvement comprising:

introducing said feed gas stream upstream of said high-temperature shift reactor stage at a temperature substantially above said high-temperature shift reactor feed gas inlet temperature, furnishing said feed gas stream to said high temperature shift reactor stage at an inlet temperature such that the temperature of the exhaust gas stream is at the maximum temperature at which the integrity of the catalyst is maintained;

passing water in heat transfer relationship with at least said higher temperature feed gas stream and said exhaust gas stream to recover thermal energy therefrom by concurrently cooling said feed and exhaust gas streams and heating said water;

heating said water by heat exchange relationship with said higher temperature feed gas stream and said exhaust gas stream, said heated water being vaporized to steam by said heat exchange relationship with said feed gas stream and said steam being superheated by said heat exchange relationship with said exhaust gas stream.

15. A process as claimed in claim 14, wherein said feed gas stream is furnished to said high-temperature shift reactor stage at a temperature in the range of about 600° F. to about 900° F.

16. A process as claimed in claim 15, wherein said step of converting thermal energy to mechanical energy comprises expanding said superheated steam in an expansion engine and exhausting steam therefrom.

17. A process as claimed in claim 16, wherein said exhaust steam is directed to said high temperature shift reactor as the water feed thereto.

* * * * *